United States Patent
Benderly (10) Patent No.: US 6,788,714 B2
(45) Date of Patent: Sep. 7, 2004

(54) LASER MARKING SYSTEM AND METHOD

(76) Inventor: David Benderly, 575 Main St., New York, NY (US) 10044

( * ) Notice: Subject to any disclaimer, the term of this patent is extended or adjusted under 35 U.S.C. 154(b) by 31 days.

(21) Appl. No.: 10/264,810

(22) Filed: Oct. 4, 2002

(65) Prior Publication Data

US 2003/0058917 A1 Mar. 27, 2003

Related U.S. Application Data

(62) Division of application No. 09/785,631, filed on Feb. 16, 2001, now Pat. No. 6,483,073.
(60) Provisional application No. 60/183,669, filed on Feb. 18, 2000.

(51) Int. Cl.[7] .................................................. H01S 3/08
(52) U.S. Cl. ............................................. 372/9; 372/90
(58) Field of Search ........................ 372/9, 103, 24.01

(56) References Cited

U.S. PATENT DOCUMENTS

| | | | | |
|---|---|---|---|---|
| 4,009,940 A | * | 3/1977 | Ohzu ........................ 359/578 |
| 4,914,671 A | * | 4/1990 | Yagi et al. .................. 372/103 |
| 5,586,139 A | * | 12/1996 | Takenaka et al. ............. 372/99 |

* cited by examiner

*Primary Examiner*—Don Wong
*Assistant Examiner*—Dung T Nguyen
(74) *Attorney, Agent, or Firm*—Kirschstein, et al.

(57) ABSTRACT

Diamonds are marked by a laser beam having a characteristic that is changeable by positioning a selected aperture in the beam within a resonant cavity of a laser source. Guidelines are positioned in advance on the diamonds, and the marking is subsequently performed between the guidelines.

14 Claims, 10 Drawing Sheets

LASER MARKING SYSTEM AND METHOD

CROSS REFERENCE TO RELATED APPLICATION

Continuing Application (prior application not abandoned): Divisional of prior application Ser. No. 09/785,631 filed on Feb. 16, 2001, now U.S. Pat. No. 6,483,073.

This application claims the benefit of U.S. Provisional Application Serial No. 60/183,669, filed Feb. 18, 2000.

BACKGROUND OF THE INVENTION

1. Field of the Invention

This invention generally relates to marking and inscribing gemstones, particularly diamonds, with indicia identifying the gemstones by directing a laser beam across surface portions of the gemstones.

2. Description of the Related Art

Laser etching or inscribing of a diamond surface for the purpose of permanently identifying a diamond is known. U.S. Pat. No. 4,392,476 to Gresser, et al. employs a Nd:YAG (1.06 $\mu$m) laser for graphitizing a series of overlapping successive positions across a diamond girdle to create an identifying indicium. U.S. Pat. No. 4,467,172 to Ehrenwald, et al. describes an inscribing apparatus using a harmonic of the fundamental frequency of a Q-switched YAG laser to mark a diamond girdle. U.S. Pat. No. 5,753,887 to Rosenwasser, et al. discloses the engraving of indicia on gemstones, especially to create decorative markings visible to the human eye on surfaces other than the girdles, by employing a Nd:YAG or a $CO_2$ laser. U.S. Pat. No. 5,932,119 to Kaplan, et al. discloses a solid-state Nd:YLF laser for inscribing diamonds under computer control.

U.S. Pat. Nos. 5,149,938, 5,410,125 and 5,573,684, all to Winston, et al., discloses the use of pulsed gas-discharge excimer lasers (operative at wavelengths from 193 nm to about 351 nm depending on the particular rare gas halide used) for directing the excimer laser beam through an external mask located between the laser and the diamond. The mask has a cutout which defines the mark. The laser beam passing through the cutout irradiates the diamond and forms an image of the cutout on the diamond.

SUMMARY OF THE INVENTION

One feature of this invention is a fine control over the output power and resolution of a laser beam by the selection of an aperture within the resonant cavity of the laser.

Another feature of this invention is a preview of the indicia to be inscribed and its location on a diamond by the advance positioning of guidelines across the diamond.

Still another feature of this invention is a topographical mapping of the diamond girdle prior to inscribing.

Yet another feature of this invention is a switching between different modes of inscribing among successive diamonds.

An additional feature of this invention is a manifest on which quality control information is printed.

Another feature of this invention is to increase the throughput of a laser inscribing system by using multiple auxiliary workstations.

Yet another feature of this invention is to control the opening and closing of doors especially those controlling access to the laser for increased safety.

DETAILED DESCRIPTION OF THE PREFERRED EMBODIMENTS

Figure 1:
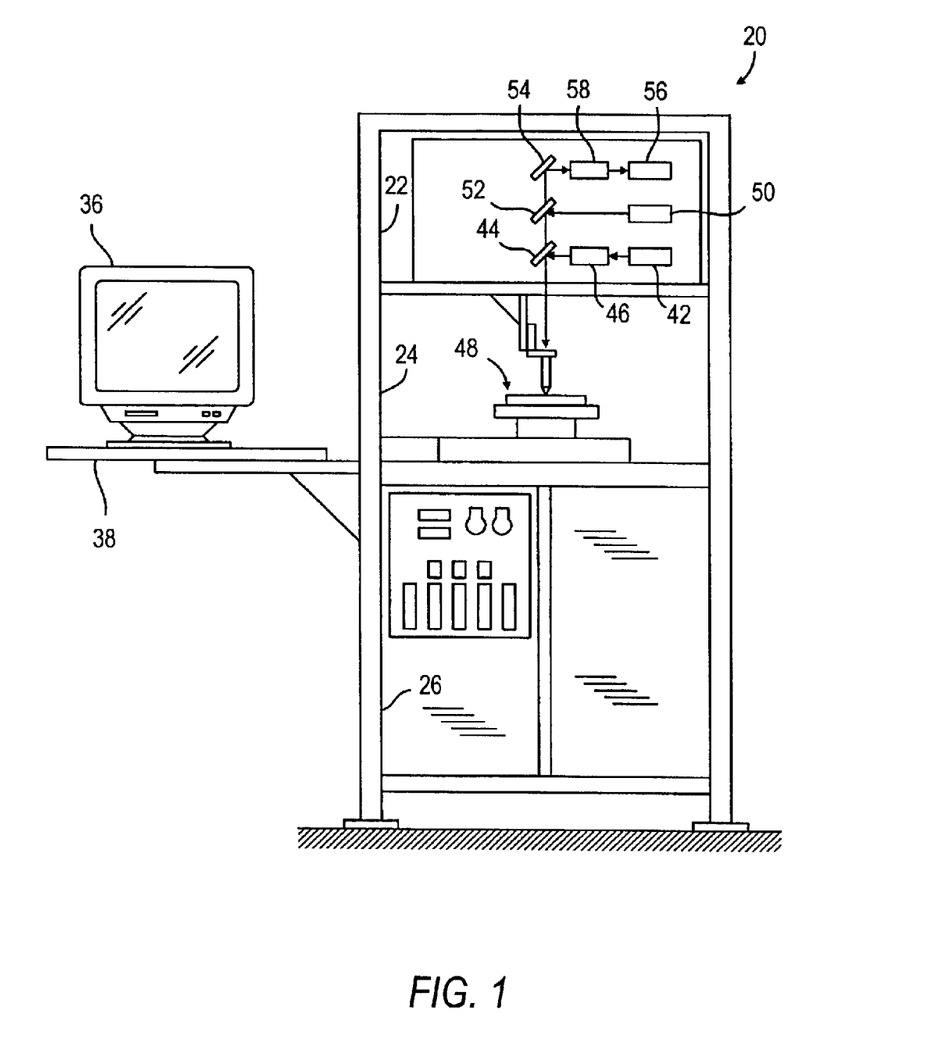
FIG. 1 is a front elevational view of a laser inscribing workstation according to this invention, but with doors to various chambers removed to view their interiors.

Referring now to the drawings, FIG. 1 is a front elevational view of a main workstation 20 for inscribing and marking indicia, such as alpha-numeric characters, with a laser on the girdle of a diamond. The workstation 20 has an upper chamber 22 for housing a laser beam delivery and imaging system, an intermediate chamber 24 for housing a fixture for holding the diamond, and a lower chamber 26 for housing a control panel and electronic circuitry for controlling workstation operation.

Figure 2:
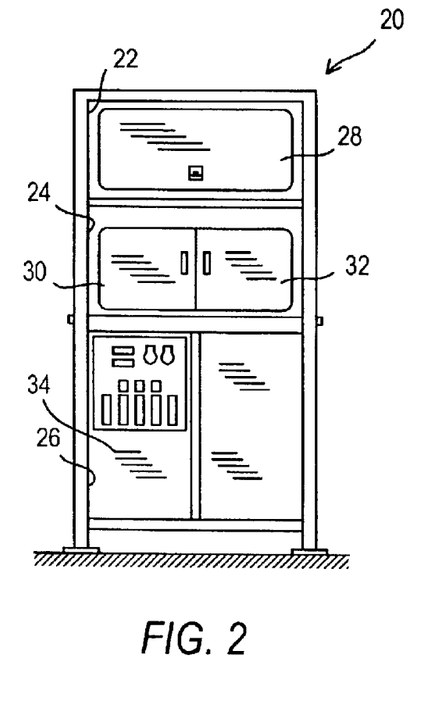
FIG. 2 is a view analogous to FIG. 1, but with the doors in their closed positions.
Figure 3:
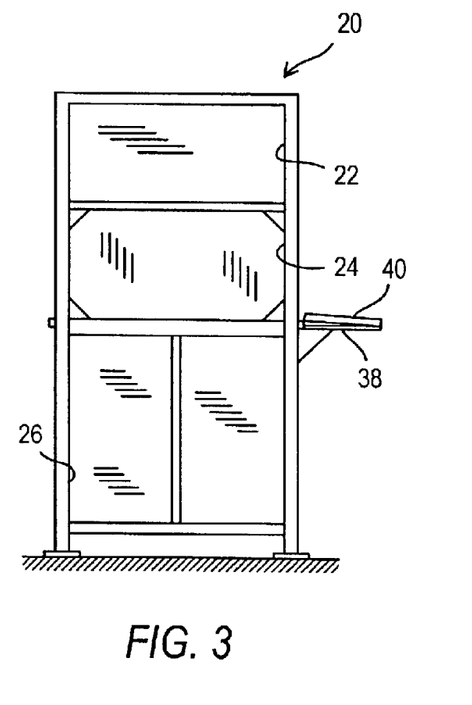
FIG. 3 is a side elevational view of the workstation of FIG. 1.

FIG. 2 is analogous to FIG. 1, and shows a door 28 in a closed position for enclosing the upper chamber 22, a pair of doors 30, 32 in a closed position for enclosing the intermediate chamber 24, and another door 34 in a closed position for enclosing the lower chamber 26. The doors 28, 30, 32, 34 are omitted from FIG. 1 for clarity. In operation, the doors are in their closed positions.

A computer monitor 36 is mounted on a side shelf 38 extending about at the same level as the intermediate chamber. A keyboard 40 and a mouse 41, as shown in FIG. 1, and an optional joystick are also mounted on the shelf 38. A computer processor is mounted in the lower chamber 26. Electrical cables have been omitted from the drawings for clarity. Likewise, the shelf was removed from FIG. 2 so as not to unduly encumber the drawings.

Figure 4:
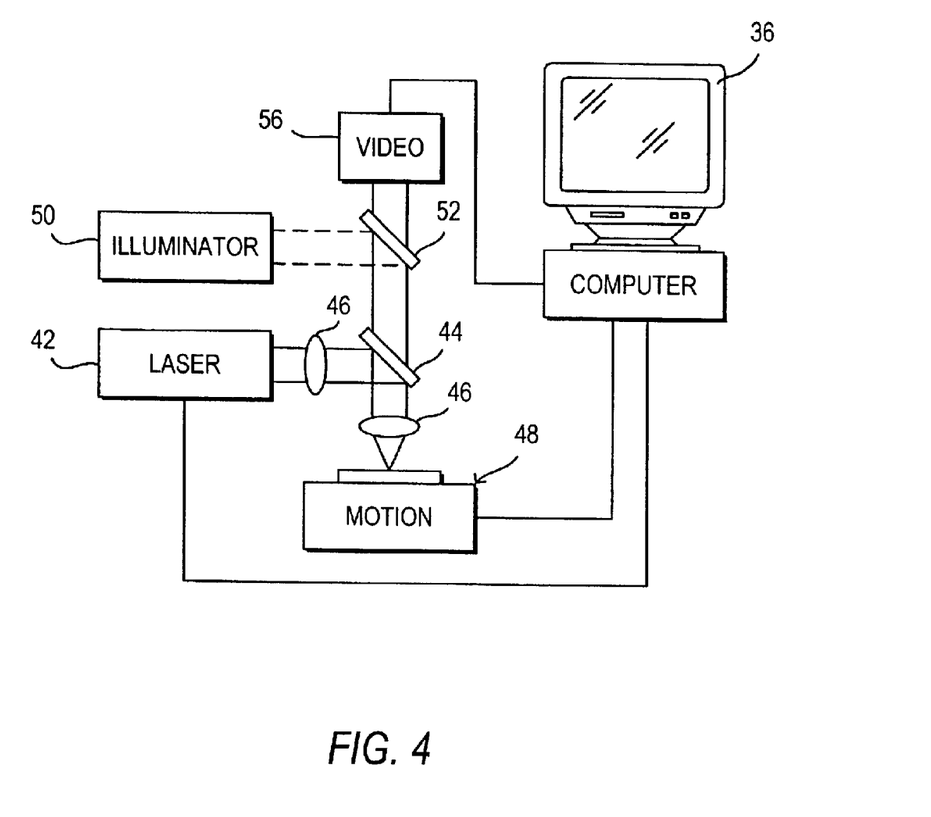
FIG. 4 is a block diagram of the laser inscribing system.

Returning to FIG. 1, the beam delivery system includes a ArF excimer laser 42 having an intra-cavity gain controller 60 as described below in connection with FIGS. 5 and 5A. This laser 42 operates at a 193 nm wavelength, a 200 kHz repetition rate, and about 2 watts average power. The laser 42 emits a beam through an optical train consisting of dielectric-coated turning mirrors 44, focusing lenses 46 and optical filters to a diamond mounted on a fixture 48 (see FIGS. 8 and 9) in the intermediate chamber 24. An illuminator 50 including at least one light emitting diode projects an illumination beam to a dielectric-coated turning mirror 52 which reflects the illumination beam along the same optical path as the laser beam to the diamond on the fixture. The diamond reflects a portion of the illumination beam back through the mirrors 44,52 to a turning mirror 54 and then to an imager 56 such as a charge coupled device. A filter 58 is preferably positioned in front of the imager. The output of the imager 56 is displayed on the monitor 36. FIG. 4 is a block diagram depicting the interaction of the parts of the beam delivery and imaging system.

Figure 5:
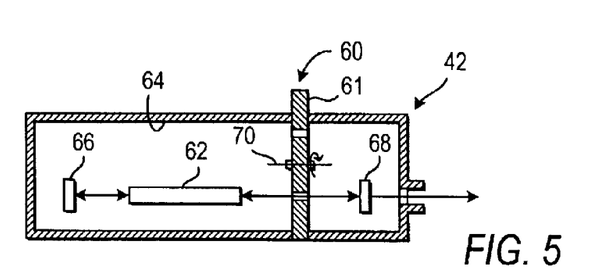
FIG. 5 is a diagrammatic view of a modified excimer laser.
Figure 6:
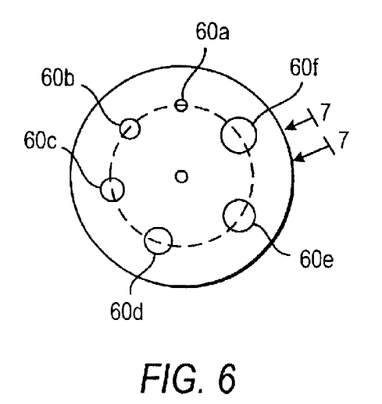
FIG. 6 is an end view of a component of the laser of FIG. 5.
Figure 7:
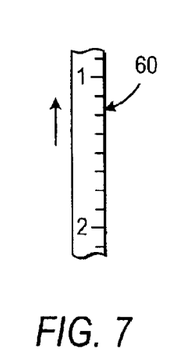
FIG. 7 is a partial enlarged view as seen in direction of the arrows 7—7 of FIG. 6.

Turning now to FIGS. 5–7, the intra-cavity gain controller 60 for the laser 42 includes an apertured element 61 operative for positioning a selected aperture in the path of photons traveling back and forth within the laser cavity in order to control the output power and energy distribution of the laser beam exiting the laser. In the preferred embodiment, a gas-containing tube 62 is positioned in a laser cavity 64 between a high reflector back mirror 66 and an output coupler 68. An energy source excites electrons in the cavity and stimulates them to emit photons which move back and forth between the mirror 66 and the coupler 68, triggering further photon emissions. The laser light finally leaves through coupler 68, but not before passing through one of the apertures of the element 61 of the controller 60.

In accordance with one embodiment, the element 61 has six apertures 60a–f of various sizes ranging from 1–6 mm in diameter arranged in an annulus, and is turnable about a shaft extending along axis 70. As shown in FIG. 6, the element 61 is circular and a part of its outer periphery extends out of the cavity to enable an operator to manually engage the periphery and turn the element until one of the apertures is in alignment with the laser beam.

The selected aperture is positioned centrally of the cross-section of the laser beam for increased beam quality. The energy distribution of a conventional excimer laser beam which has not been modified by the controller 60 resembles a bell curve with a flattened top. The centrally positioned aperture only permits the flattened area, i.e., the region of constant energy distribution, to be output from the laser.

The size of the selected aperture controls the output power and resolution of the laser beam. For a given power level, the controller enables graphitization on the diamond with a smaller spot size.

The apertures need not be circular, but can have other shapes. The manual turning of the element 61 can be replaced by an automatic positioning system. Rather than allowing a peripheral part of the controller to extend outside the cavity, the entire controller can be located within the cavity, in which case, a light transmissive window is recommended for enabling an operator to see which aperture has been selected. FIG. 7 depicts a scale on the periphery of the controller which helps the operator know which aperture was selected. The controller 60 can be replaced by a pair of members arranged to move toward and away from each other to bound apertures of different sizes.

Figure 5A:
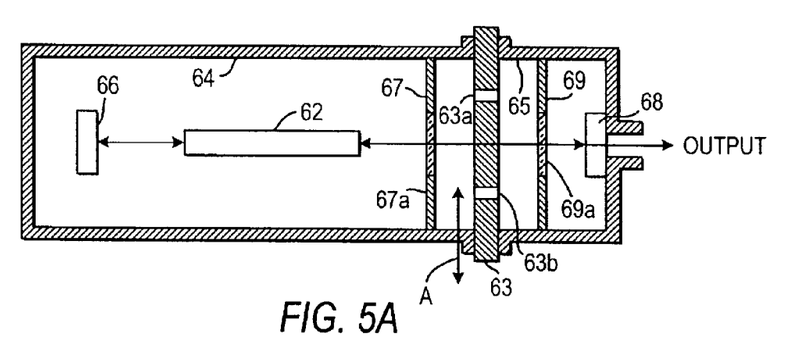
FIG. 5A is a view analogous to FIG. 5 of another modified excimer laser.

In accordance with a preferred embodiment of the intra-cavity gain controller depicted in FIG. 5A, rather than turning the element to align one of the apertures with the laser beam, an apertured element 63 is linearly slidably movable in direction of the arrows A in a chamber 65 bounded by walls 67, 69 having transmissive windows 67a, 69a until one of the apertures 63a, 63b is aligned with the laser beam that is traveling within the laser cavity 64 from the gas-containing tube 62 between the back mirror 66 and the output coupler 68, as described above. The element 63 is positioned in the isolated chamber 65. As before, the size of the selected aperture controls the output power and resolution of the laser beam.

The placement of the apertured element inside the resonant cavity is counter to established industrial practice because the presence of the element inside the resonant cavity causes the laser energy to collapse. Hence, the prior art has uniformly proposed the use of exterior masks to shape the cross-section of the laser beam. However, an exterior mask is exposed to the full energy of the laser beam and, hence, is constituted of a relatively rigid material so that it will not quickly be eroded and degraded.

The interior apertured element of this invention, by contrast, is not subject to extensive attack and erosion and can, for example, be made of fused silica or a glass plate of laser-transmissive material and on which an opaque, metallic film is applied in a predetermined pattern to allow the laser beam to pass through the non-opaqued areas.

Figure 8:
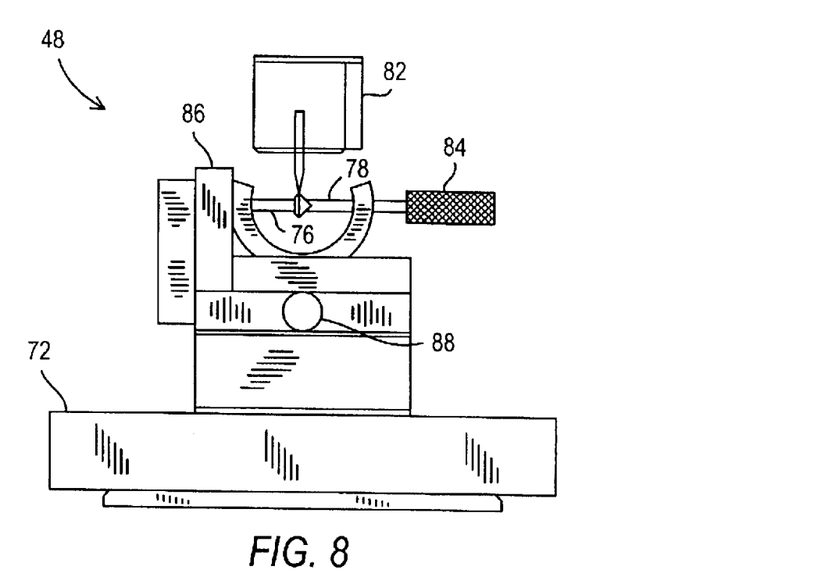
FIG. 8 is an enlarged front elevational view of part of the workstation of FIG. 1.
Figure 9:
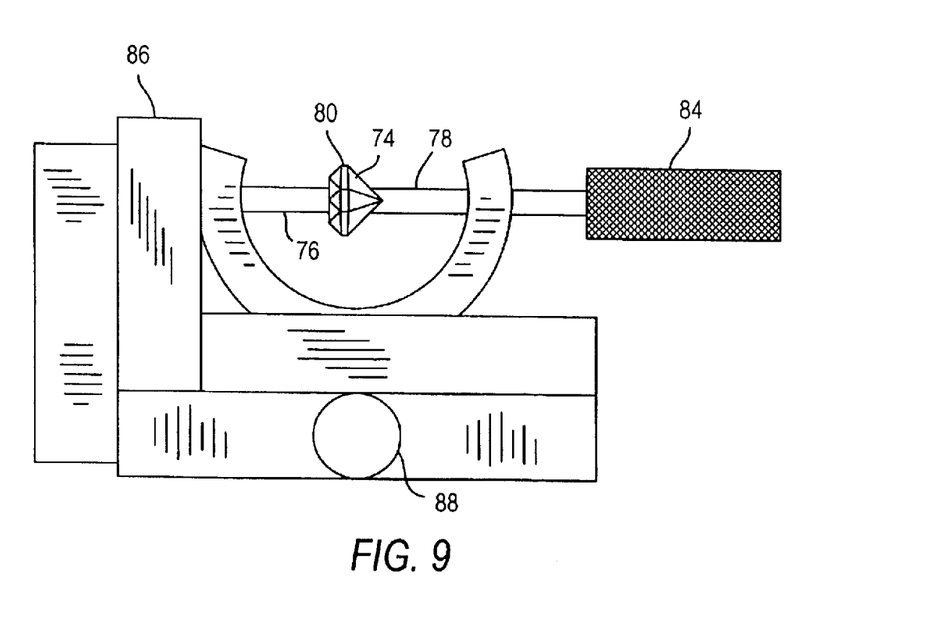
FIG. 9 is an enlarged view of part of FIG. 8.

Turning now to FIGS. 8 and 9, the fixture 48 includes a DC servomotor circuit for moving an X-Y stage 72, independently along two mutually orthogonal directions along working strokes of 6 inches in sub-micron increments. A thumbwheel control or a joystick can be used for manual movement. Optical encoders are used for position sensing.

A diamond 74 is supported between two grips 76,78 with the girdle 80 facing upwardly toward the overhead focusing system 82 through which the laser beam passes. A turntable rotary knob 84 moves the grip 78 toward the diamond to clamp the diamond in position. An automatic rotary servomotor 86 turns the diamond about an axis extending through the grips 76,78, thereby exposing more potions of the girdle to the overhead laser beam. A quick release mount 88 enables the sub-assembly shown in FIG. 9 to be interchanged with another.

Figure 10:
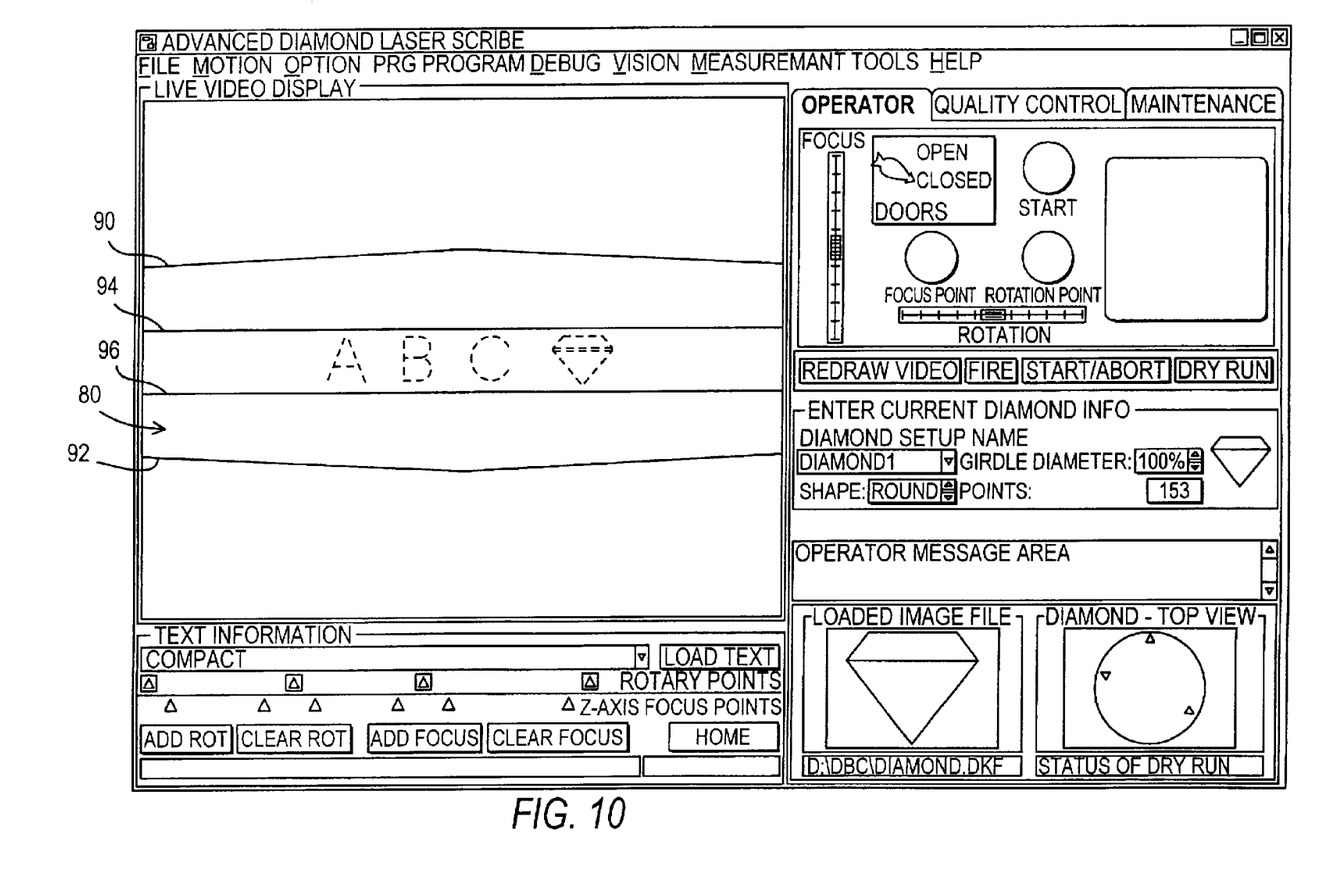
FIG. 10 is a screenshot during an operator mode of operation.
Figure 11:
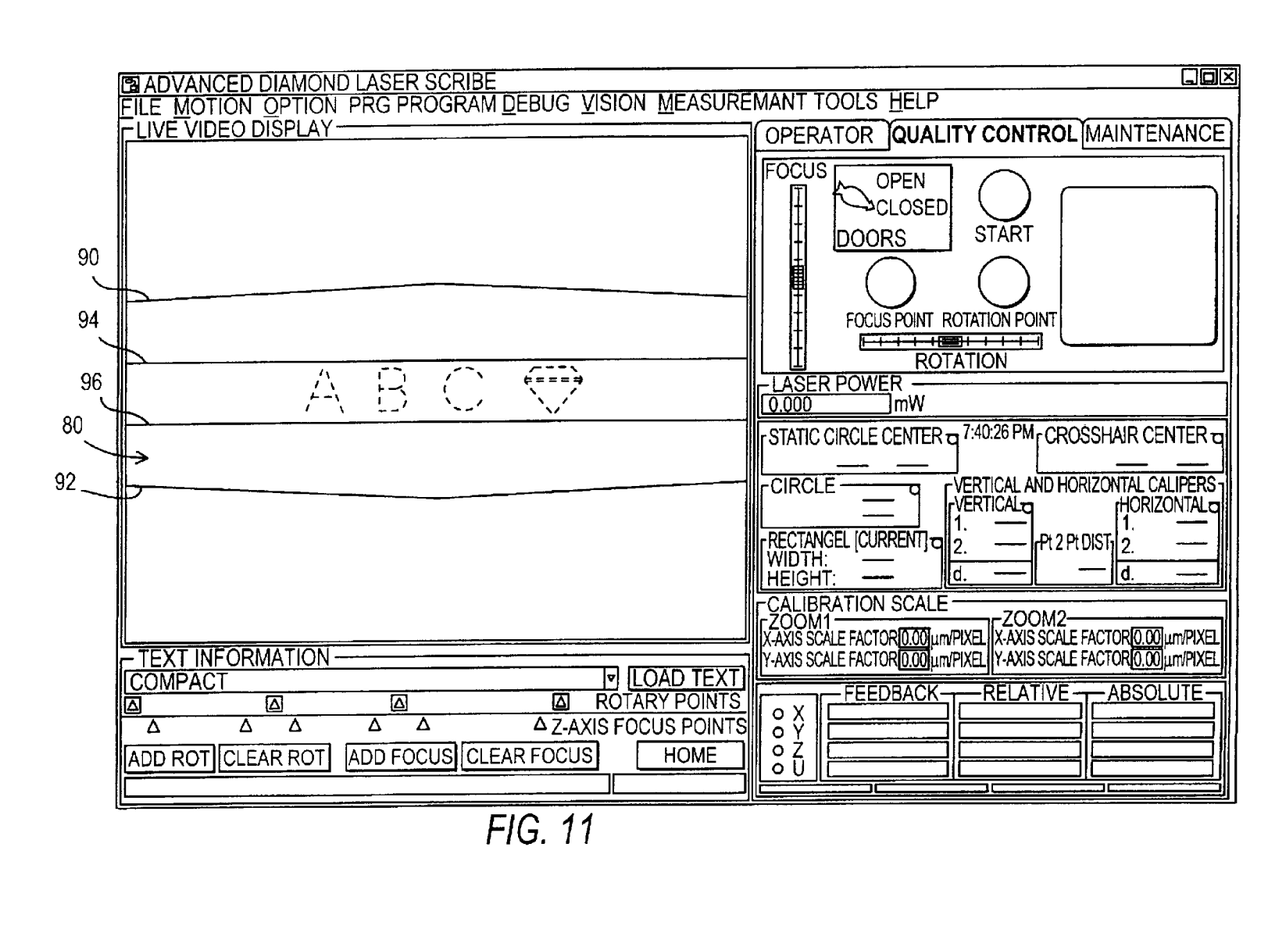
FIG. 11 is a screenshot during a quality control mode of operation.
Figure 12:
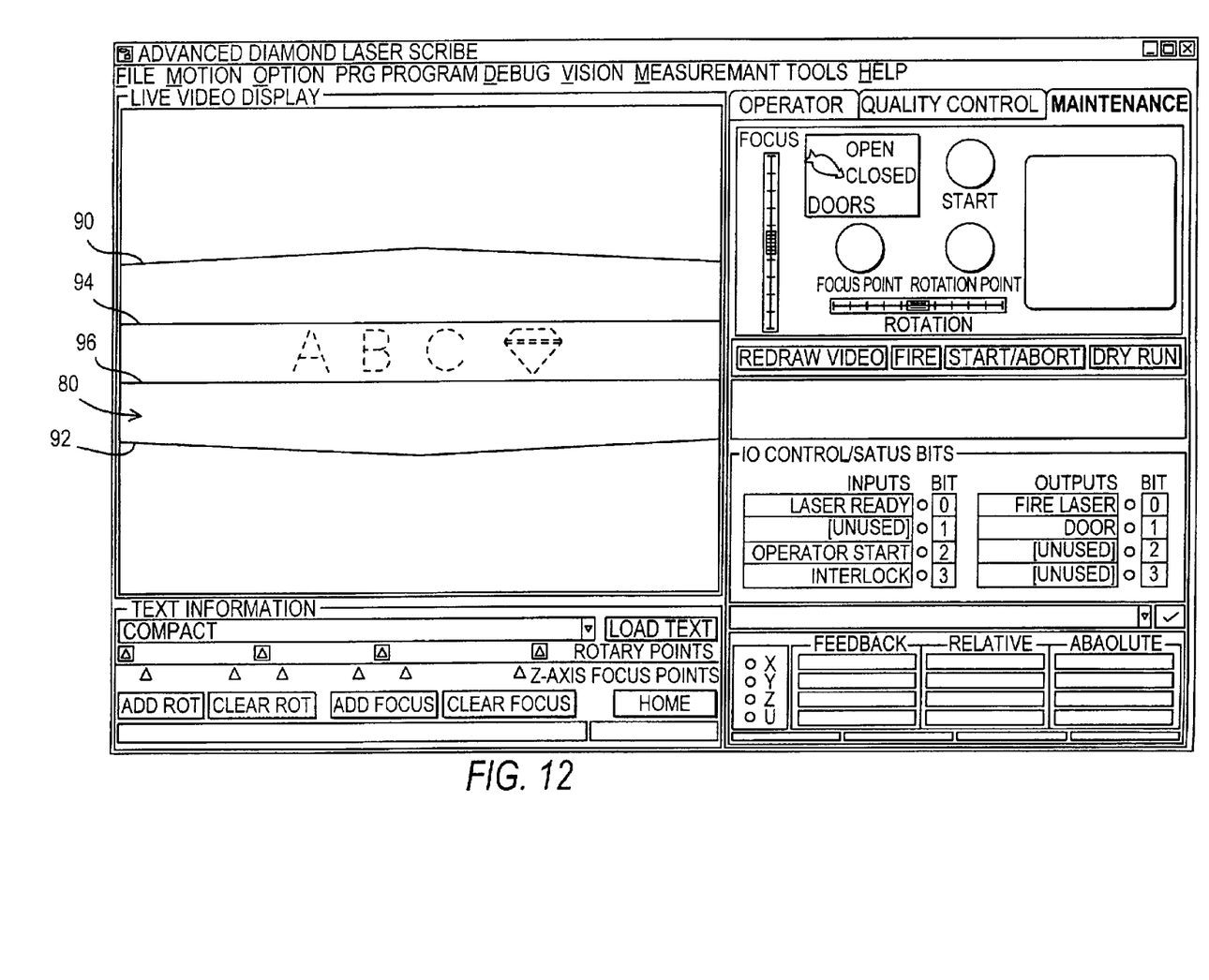
FIG. 12 is a screenshot during a maintenance mode of operation.

FIGS. 10–12 are screenshots off the monitor 36 in three separate modes of operation, namely operator, quality control and maintenance, respectively. After the diamond 74 is mounted in the fixture, the CCD imager 56 generates a live video display of the girdle 80 and enables the operator to see the crown facet line 90 and the pavilion facet line 92 which bound the girdle.

The system superimposes a pair of virtual guidelines 94,96 over the live image of the girdle. The operator can manually move the guidelines, or they can be automatically positioned between the facet lines 90,92. The indicia to be inscribed on the girdle will be positioned between these guidelines. As illustrated, the indicia are the letters "A, B, C" and a stylized image of a diamond. The guidelines enable the operator to preview the indicia and to check its placement.

For proper inscribing, the excimer laser beam is focused as a beam spot on the girdle. The energy distribution across the spot is relatively constant due to the controller 60. The focused spot is positioned on the girdle by relative movement of the overhead focusing system 82 and/or the diamond fixture 48. The short wavelength of the laser beam signifies a short depth of field ($0.5\mu$) for the focused spot. In the case where the indicia to be inscribed extends circumferentially at least partly around the girdle, the focused beam spot at a first location may be unfocused at a second location angularly offset from the first location. This is especially so when the girdle is not truly round, which is virtually always the case, even for a so-called round diamond.

To insure a focused spot throughout the inscribing of indicia circumferentially around the girdle, the topography of the girdle is either automatically or manually mapped. A three-dimensional imaging system, or a digital caliper, or a laser triangulator, can be used, or a plurality of discrete positions along the girdle can be mapped. For example, two end positions at opposite ends of the indicia, and a middle position centrally located between the end positions, can be detected during an initial calibration. A curve mapping algorithm or linear interpolation is run to calculate the various positions between the end positions. Alternatively, a multitude of positions can be mapped in small increments so that a position calculation need not be run. Hence, for each position of the girdle, the distance from the overhead focusing system to the girdle is known, and the focus of the beam spot can be accordingly adjusted for each position.

Another mapping technique involves positioning the diamond between a linear array of light emitters and a linear array of light detectors. By rotating the diamond through a multitude of angular increments, one of the detectors will detect an unblocked beam from one of the emitters for each increment, thereby signifying the curvature of the girdle.

Still another manual mapping technique includes moving the fixture along the optical path until the beam spot on the diamond surface is in focus, and then recording the fixture position. The steps are repeated for additional areas on the diamond surface. As before, a curve mapping algorithm or linear interpolation process is run.

Figure 13:
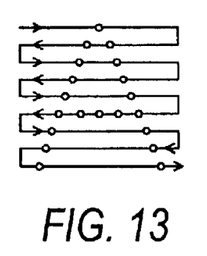
FIG. 13 is a diagrammatic view of inscribing a character in a raster mode of operation.
Figure 14:
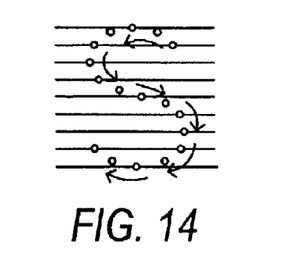
FIG. 14 is a diagrammatic view of inscribing a character in a vector mode of operation.

The inscribing can be performed in a raster mode as depicted for the letter "A" in FIG. 13, or in a vector mode as depicted for the letter "S" in FIG. 14. The vector mode is especially suitable for inscribing alphanumeric characters. The raster mode is more suitable for inscribing logos, gray scale images, and one dimensional and two dimensional bar code symbols. One feature of this invention is the capability of switching between modes for successive diamonds.

During inscribing, the aforementioned doors 28, 30, 32, 34 are closed. The doors may be opened by depressing a foot pedal, or manually, or preferably automatically by software control. The doors are also preferably automatically closed as a safety feature to prevent escape of ultraviolet radiation from the excimer laser.

Figure 15:
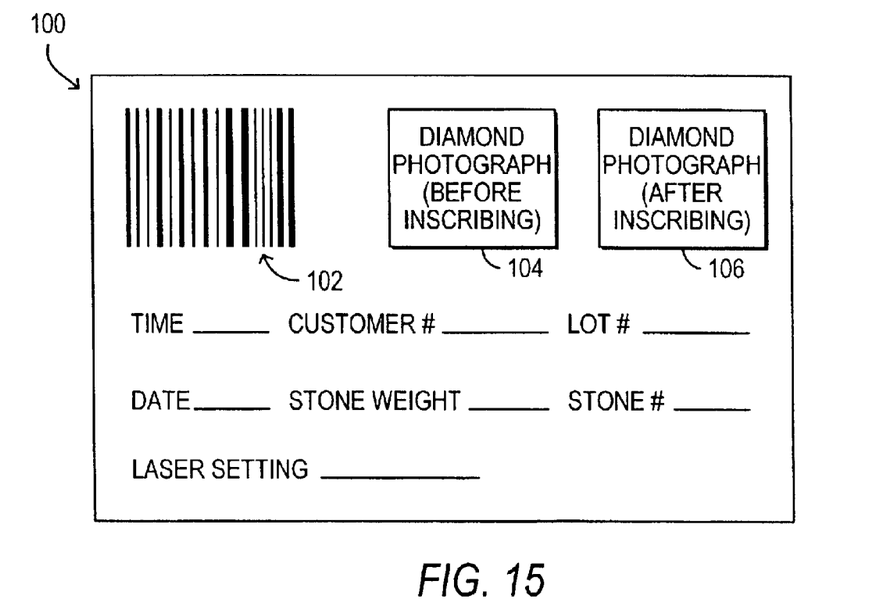
FIG. 15 is a printed manifest.

FIG. 15 depicts a manifest 100 or list that provides a record of the inscribing job, useful for quality assurance purposes. The manifest bears printed information, such as a bar code symbol 102 indicating the job number, a photograph 104 of the diamond before inscribing, a photograph 106 of the diamond after inscribing, the time, the date, the customer number, the stone weight, the lot number, the stone number, the laser settings and, in short, any information deemed useful or desirable.

Figure 16:
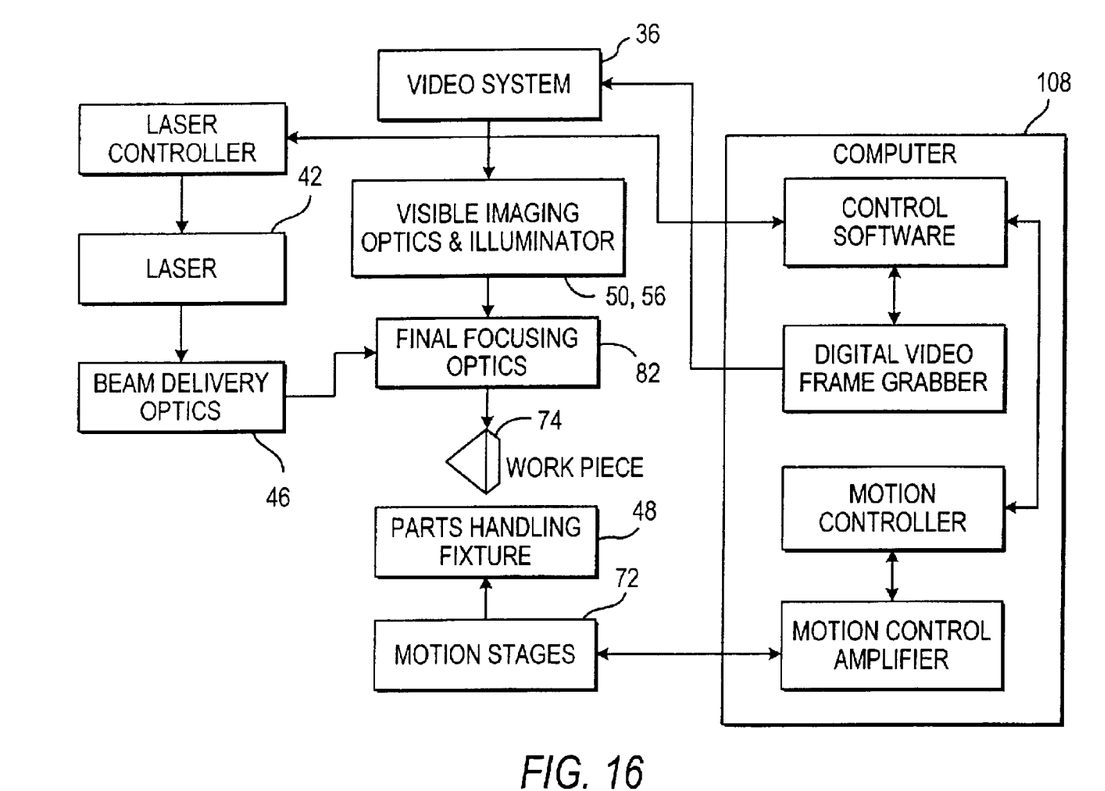
FIG. 16 is an overall system block diagram.

FIG. 16 is a general block diagram of the overall system and depicts the computer 108 located within the lower compartment 26.

For increased throughput, an auxiliary workstation identical to the main workstation 20 is used not for inscribing, but for setup. A diamond is installed in the fixture in the auxiliary workstation. This is a generally time consuming manual operation and takes much longer than the scribing procedure. Once installed, the fixture and the installed diamond are removed from the auxiliary workstation and positioned in the main station where scribing is performed. It is contemplated that multiple auxiliary workstations will be employed to supply a single main workstation.

It will be understood that each of the elements described above, or two or more together, also may find a useful application in other types of constructions differing from the types described above. For example, the guidelines need not be positioned on a girdle of a diamond, but could be positioned anywhere on an object to be marked.

While the invention has been illustrated and described as embodied in a laser marking system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An intra-cavity controller for changing a characteristic of a laser beam, comprising:

a) a housing having walls bounding a resonant cavity and an output port through which the laser beam exits the housing along a longitudinal direction; and b) a movable apertured element having a plurality of apertures of different sizes in cross-section as considered in a transverse plane perpendicular to the longitudinal direction, the apertures being spaced apart of one another along the transverse plane, each aperture extending through the element along the longitudinal direction, the element being supported by the housing for movement in the transverse plane within the resonant cavity from an offset position in which a selected one of the apertures is misaligned with the output port, to an aligned position in which the selected one of the apertures is aligned with the output port to enable the laser beam to pass through the selected one of the apertures en route to the output port.

2. The controller of claim 1, wherein the housing is elongated and extends between opposite end regions, and wherein the element is located between the end regions of the housing.

3. The controller of claim 2, and an output coupler adjacent the output port at one of the end regions, and a rear mirror at the other of the end regions, and wherein the element is located between the output coupler and the rear mirror.

4. The controller of claim 1, wherein the element is mounted on a shaft supported by the housing, and wherein the apertures are successively arranged along an annulus centered on the shaft.

5. The controller of claim 1, wherein the element is a circular plate.

6. The controller of claim 1, wherein a part of the element extends exteriorly of the housing.

7. The controller of claim 1, wherein the walls slidingly engage the element for linear sliding movement, and wherein the apertures are successively arranged along a linear row.

8. The controller of claim 1, wherein the apertures are circular having respective diameters in a range from 1 mm to 6 mm.

9. The controller of claim 1, wherein the element is planar.

10. The controller of claim 1, wherein the apertures are successively arranged in order of their sizes.

11. The controller of claim 1, and a scale on the element for visually indicating the selected one of the apertures.

12. The controller of claim 1, wherein the housing has interior partitions bounding a compartment, and wherein the element is mounted in the compartment.

13. The controller of claim 12, wherein the interior partitions have light-transmissive portions through which the laser beam passes.

14. The controller of claim 1, wherein the laser beam characteristic is output power.

* * * * *